April 10, 1956 W. H. HILL 2,741,530

ELECTRIC FACSIMILE RECORDERS

Filed May 6, 1952

INVENTOR.
WILLIAM H. HILL
BY John J. Rogan
ATTORNEY.

2,741,530
Patented Apr. 10, 1956

2,741,530

ELECTRIC FACSIMILE RECORDERS

William H. Hill, West Brighton, N. Y., assignor to Times Facsimile Corporation, New York, N. Y., a corporation of New York Application May 6, 1952, Serial No. 286,305

6 Claims. (Cl. 346—138)

This invention relates to electric facsimile recorders and more especially to recorders using an electrically energized recording stylus.

The invention finds its primary usefulness in facsimile recorders which use carbon containing record blanks, although in certain of its aspects the invention is useful in recording on a wide variety of record blanks.

A principal object of the invention is to provide an improved rotary scanning drum and an electrically energized stylus combination whereby more uniform recordings are obtainable.

Another object is to provide a facsimile rotary scanning drum recorder and an electrically energized stylus combination, wherein means are provided for cleaning the stylus at the end of each recorded line.

Another object is to provide a novel stylus cleaning arrangement for facsimile recorders and the like, whereby a recording stylus which normally tends to accumulate and hold particles at its tip, is subjected to a momentary and cyclically repeated scraping to remove such accumulated material without undue wearing away of the stylus tip.

A feature of the invention relates to a rotary scanning drum for facsimile machines and the like, which has a strip of a roughened surface material, for example abrasive or scraping material, located adjacent the ends of a record blank which is wrapped around the drum. The strip is designed to coact with the stylus to subject the tip of the stylus to a recurrent cleaning action.

A further feature relates to a novel stylus cleaning arrangement for facsimile machines and the like, in the form of a wire bristle brush which forms part of or is attached to the scanning drum, and which occupies a minimum of space while efficiently cleaning the stylus once for each revolution of the drum.

A further feature relates to the novel organization, arrangement and relative location and interconnection of parts which cooperate to provide an improved facsimile recorder.

Other features and advantages not particularly enumerated, will be apparent after a consideration of the following detailed descriptions and the appended claims.

Figures 1, 2:
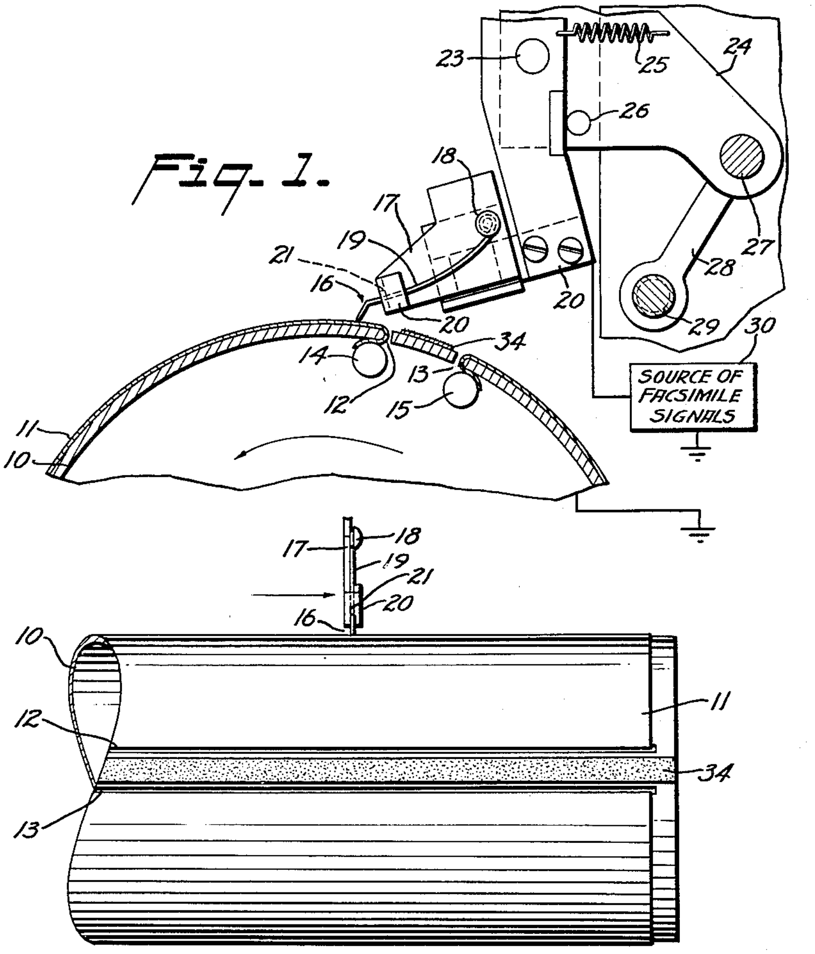
Fig. 1 is an end view of part of a facsimile recording drum and part of the associated stylus assembly according to the invention.
Fig. 2 is a front view of part of the drum and stylus assembly of Fig. 1.

Referring to Fig. 1, there is shown in end view, part of a rotary drum 10, around which is wrapped and clamped in any well-known manner the record blank 11. For example, drum 10 which may be of metal, may be provided with two spaced slits 12, 13, extending parallel to each other but terminating short of the drum ends. Any well-known spring-pressed and releasable clamping means represented schematically by the members 14, 15, may be used to clamp the ends of the blank 11 against the internal surface of the drum adjacent the slits 12, 13.

Arranged to make contact with the blank 11 is a stylus assembly comprising the fine wire stylus 16, which for example may be of tungsten wire of approximately 0.006 inch diameter. Wire 16 is fastened at one end to a metal plate 17 by means of a suitable screw or rivet 18 and its forward recording end is bent so as to form an angle of approximately 150 degrees with the body portion 19, and at an angle of between 30 and 60 degrees with respect to the drum. Preferably, the portion 19 is given a slight camber so as to impart the desired light pressure, for example 3 to 5 grams between the wire tip and the blank 11. Thus the stylus proper has very small inertia and is capable of flexure in a vertical plane (that is the plane of the drawing) with relation to the point of attachment to plate 17.

In order to prevent the stylus wandering laterally, the plate 17 may be bent back upon itself to form a flange 20 which is slightly spaced from the remainder of the plate 17 and the bent-back edge is cut out to provide a slot 21 through which the stylus wire passes. The spacing between plate 17 and flange 20 is only slightly greater than the diameter of the stylus wire so as to permit this wire to be freely supported for flexure in a vertical plane while limiting its lateral shifting. Preferably the body 19 is bent so that it resiliently stays against the face of plate 17, thus preventing it wandering laterally, while preventing bending.

The stylus supporting plate 17 may be attached to a member 22 which is swingably supported, for example at 23, on a head 24. A tension spring 25 fastened at one end to head 24 and at the other end to member 22, tends to swing the member 22 and the stylus assembly clockwise so as to counter-balance the weight of the said stylus assembly. The limit of counterclockwise swinging of the stylus assembly is fixed by the stop 26. Thus, by proper design of spring 25 as compared with the weight and mounting of the stylus assembly, the latter can be held so that the stylus tip engages the blank 11 with just the right amount of resilient pressure.

The head 24 may ride along a suitable guide rail 27 extending parallel to the length of drum 10; the head may also be provided with an arm 28 which threadedly engages a lead screw 29. Thus, for each complete rotation of the drum, the stylus is indexed along the drum length as indicated in the direction of the arrow (Fig. 2) a distance corresponding to the width of a scanning line, for example 0.01 inch. For example, the tip of the stylus may be 6 mils and the line feed may be 7 mils. Since the mechanism for rotating the drum and lead screw are well-known in the art, description thereof is not required herein.

Figure 3:
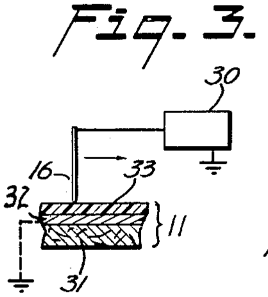
Fig. 3 is an enlarged cross-sectional view of part of a typical record blank that may be used for recording.

In using the mechanism to record on the blank 10, the stylus 16 is connected in circuit to the ungrounded terminal of a suitable source 30 of electric facsimile signals, and the drum 10 and the blank 11 are grounded. The electric signal potentials impressed on the stylus cause the blank 10 to be acted upon in minute electrical areas. For example, if blank 10 is of the type comprising a paper backing 31 (Fig. 3), which has a conductive carbon coating 32 and a top or whitish masking coating 33, the signal potentials impressed on the stylus 16 remove the masking coating 33 by electrical disintegration thereof caused by the flow of current from the stylus 16 through the coating 33 to the grounded carbon coating 32. In order to preserve uniformity in the dimensions of each recorded elemental area for a given signal current, it is necessary that the actual area at the tip of the wire stylus remain unchanged during the entire recording.

It has been found that unless certain precautions are taken, the wire stylus tends to accumulate a deposit of carbon or other material from the record blank and this deposit increases the actual recording area at the stylus tip. This results in an undesired and uncontrollable increase in the size of the recorded dot, or in the size of the recorded hole in the event that the record blank is of the stencil-forming type. This further results in reduced definition in the recorded copy. Furthermore, this accumulated material on the stylus tip may drop off at random intervals causing an appearance in the recorded copy of a change which it not correlated with the applied facsimile signal.

During the actual recording operation, the disintegration of the coating 33 is in the nature of a minute explosion which tends to react on the fine wire stylus. As long as the tip of the stylus remains of uniform area, this explosive action also remains uniform. Because of the very low inertia of the fine wire stylus, the undesired accumulation of particles at the tip thereof by undesirably changing the effective area thereof also causes the explosive recording action to change the reactive effect on the stylus. This reactive or blasting effect will then result in an undesired deflection of the stylus and will be exhibited as improper stylus tracking and appearance of irregular lines in the recorded copy. Furthermore, the accumulation of the carbon particles at the tip of the stylus may convert the stylus itself into somewhat of a marking pencil which may produce undesired marks on the record blank even in the absence of signals.

In accordance with the present invention, the above-described and other disadvantages are overcome by subjecting the stylus at the end of each scanning line to a mechanical scraping action to dislodge the accumulated particles from the stylus tip. For this purpose, there is attached to the drum surface preferably between the slits 12, 13, a strip 34 of rough surfaced material. The invention is not limited to any particular manner of attaching this strip to the drum, but preferably the strip is of sufficient thickness so that when attached, it is flush with, or slightly above, the surface of the blank 11. If desired, the strip 34 may be constituted of any suitable lightly abrasive material such for example as Carborundum "Tri-Mite" #100, which does not exert any substantial wear on the stylus tip, it being understood that the abrasive surface is such that it is not removed either mechanically or electrically by the stylus as the tip of the stylus rides thereover. Preferably the recording current is automatically interrupted at the instant the stylus is riding over the scraping strip.

Figure 4:
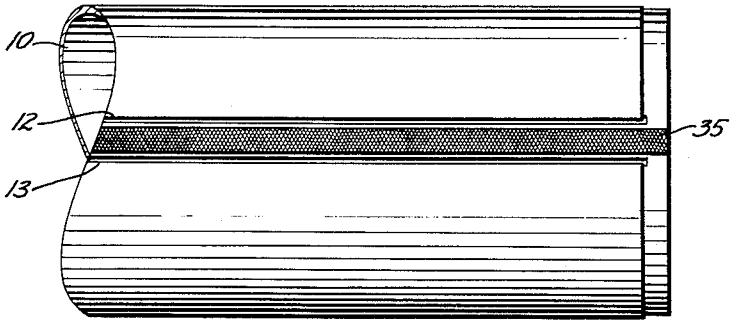
Fig. 4 is a view similar to Fig. 2, but showing a modification of the invention.

Instead of applying the abrasive cleaning strip 34 as a separate member to the drum surface, the portion of the drum between the slits 12 and 13, may be specially roughened, for example by etching, sandblasting or the like, to impart the required roughness so as to scrape the stylus 16 to the required extent when it rides thereover, without excessive wear on the stylus. If desired, the stylus cleaning strip can be in the form of a metal insert 35 which has its surface roughened, such for example as a cross-cut file, as shown in Fig. 4, and which may be insulated from the drum 10.

Figure 5:
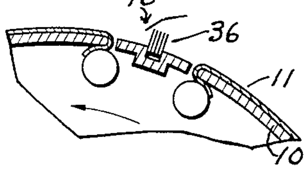
Fig. 5 is a sectional view of part of the scanning drum and blank, embodying another modification of the stylus cleaning device in the form of a wire bristle brush.
Figure 6:
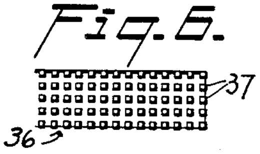
Fig. 6 is a greatly magnified view of part of the stylus cleaning device of Fig. 5, looking at the end of the brush bristles.

Instead of using an abrasive strip or a roughened metal strip to effect the cleaning action, that action may be effected by a brush having wire bristles. Such an arrangement is illustrated in Fig. 5 wherein the cleaning brush 36 is suitably mounted or attached to the drum 10 between the ends of the blank 11. I have found that the best results are obtained when the bristles 37 are square or polygonal in cross section, as indicated in the magnified view of Fig. 6.

It should be observed that the desired efficient cleaning of the stylus is a result of the relatively small surface represented by the tip of the stylus, as compared with the large abrasive particles of strip 34, or of the large roughened elements of the strip 35 (Fig. 4), or of the relatively large cross section of the bristles 37 (Fig. 5). The net result is that the cleaning elements will not materially cut or affect the actual tip of the stylus but will scrape the sides or edges of the stylus to dislodge the accumulated particles.

The removal of this accumulated material maintains a substantially uniform contact resistance between the stylus tip and the record blank 11. Since the accuracy of the recording is to be determined by electric signal potentials, it is quite clear therefore, that the maintenance of this uniform contact resistance beneath the stylus is of great importance in preserving uniformity of recordings for given applied signal potentials. Furthermore, the use of the cleaning strip as disclosed, enables higher current densities to be used on the recording stylus and assures that the size of the recorded dots or the recorded holes, in the case of a stencil-forming record blank, can be controlled substantially entirely by the physical area of the stylus tip in contact with the record blank and the current density.

Various changes and modifications may be made in the disclosed embodiments without departing from the spirit and scope of the invention.

What is claimed is:

1. In a recorder, the combination of an electrically energized recording stylus electrode, a rotatable drum upon which a record blank is mounted with a space between the opposite ends of the blank, and abrasive scraper means carried by the drum and located between said blank ends to subject the stylus to a scraping action once for each revolution of the drum.

2. In a recorder, the combination of a rotatable drum, means to hold a record blank on said drum, an electrically energized recording stylus, means to support said stylus with its tip adjacent the record blank while substantially limiting the stylus motion to flexural vibration in a plane perpendicular to the axis of the drum rotation, and means to subject said stylus to an abrasive scraping once per revolution of the drum to dislodge accumulated particles therefrom.

3. In a recorder, the combination of a rotatable drum, an electrically energizable stylus electrode, means to fasten a record blank wrapped around the drum and with a space between the fastened ends of the blank, and means carried by the drum to mechanically engage the stylus once per revolution of the drum to dislodge accumulated particles from the stylus, the last mentioned means including a roughened surface located in said space and extending along the drum between said fastened ends of the blank.

4. In a recorder, the combination of a rotatable drum, an electrically energizable stylus electrode, means to fasten a record blank wrapped around the drum and with a space between the fastened ends of the blank, and means carried by the drum to mechanically engage the stylus once per revolution of the drum to dislodge accumulated particles from the stylus, the last mentioned means including a strip having an abrasive surface extending along the drum in said space between the fastened ends of the blank.

5. In a recorder, the combination of a rotatable drum, an electrically energizable stylus electrode, means to fasten a record blank wrapped around the drum and with a space between the fastened ends of the blank, and means carried by the drum to mechanically engage the stylus once per revolution of the drum to dislodge accumulated particles from the stylus, the last mentioned means comprising a roughened surface strip attached to said drum and located in said space between the fastened ends of the blank, and having an outer surface substantially flush with the wrapped blank.

6. In a recorder, the combination of a rotatable drum, an electrically energizable stylus electrode, means to fasten a record blank wrapped around the drum and with a space between the fastened ends of the blank, and means carried by the drum to mechanically engage the stylus once per revolution of the drum to dislodge accumulated particles from the stylus, the last-mentioned means including a metal strip attached to said drum in said space between the fastened ends of the blank said metal strip having its outer surface constituted of an abrasive scraping material.

References Cited in the file of this patent

UNITED STATES PATENTS

| | | |
|---|---|---|
| 1,643,770 | Holland | Sept. 27, 1927 |
| 2,085,093 | Gauthier | June 29, 1937 |
| 2,125,345 | Hunt | Aug. 2, 1938 |
| 2,548,583 | Boyajian et al. | Apr. 10, 1951 |
| 2,582,374 | Dalke | Jan. 15, 1952 |
| 2,591,640 | Tribble | Apr. 1, 1952 |
| 2,639,211 | Hallden et al. | May 19, 1953 |